Patented Apr. 21, 1936

2,038,298

UNITED STATES PATENT OFFICE

2,038,298

AMINE SALTS OF DYESTUFFS CONTAINING ONE OR MORE ACID GROUPS AND THEIR PRODUCTION

Harry George Kiernan, Buffalo, N. Y., assignor to National Aniline and Chemical Company, Inc., New York, N. Y., a corporation of New York No Drawing. Application May 27, 1930, Serial No. 456,301. Renewed August 29, 1935

24 Claims. (Cl. 260—44.6)

The present invention relates to new coloring matters and to compositions containing the same. The process of preparing the new coloring matters and the process of preparing the compositions containing the same, also form a part of the present invention.

According to the present invention, I have found that new coloring matters may be prepared which comprise the organic reaction products of a dyestuff containing an acid group with an arylamine containing an inorganic substituent in the nucleus. Further, in accordance with the present invention, the new coloring matters may be compounded with plastic, coating or molding compositions, with or without the presence of a suitable solvent therefor. They may be also employed as pigments or lakes, or they may be employed as stains in solution with a suitable solvent, etc.

In preparing the new coloring matters, according to the present invention, a dyestuff containing at least one acid group is reacted with an arylamine containing at least one inorganic substituent in the nucleus to produce an amine salt. The combination may be conveniently effected by reacting, in the presence of an acid, a metal salt of the said dyestuff with the said arylamine. The reaction preferably is carried out in an aqueous medium, by adding to a hot water solution of a water soluble metal salt of said dyestuff a solution of a salt of the said arylamine to form the new coloring matters which are precipitated out of solution and may be filtered off and dried. The new coloring matters may be incorporated with plastic, coating or molding compositions, such as natural or artificial resins (for example, shellac, bakelite resins, glyptal resins, etc.), pyroxylin, cellulose esters and ethers, varnish, etc., with or without the presence of a suitable solvent therefor, to produce colored masses or solutions of the same. They may also be dissolved in suitable solvents for use in staining wood, etc.

In general, the new coloring matters differ in solubility in various solvents in marked degree from the parent dyestuffs from which they are prepared. Generally, the solubility in water of the new coloring matters is less than the metal salts of the parent dyestuffs. The water insoluble new coloring matters are especially adapted for use as pigments, lakes, etc. Many of the new coloring matters are soluble in alcohol. In some cases, the shade or color of the new coloring matter is varied by combination with the arylamine.

The new coloring matters may be incorporated with various compositions as hereinbefore mentioned. Lacquers colored with the new spirit soluble coloring matters furnish coatings distinguished by richness of shade and brightness on materials of all kinds. The alcohol soluble new coloring matters have a distinct advantage over oil soluble dyes ordinarily used in celluloid compositions in that celluloid plastics colored with the new dyes can be cemented to white or to other different shades of celluloid without bleeding. The new alcohol soluble dyes are particularly desirable for use in staining wood which is to be coated with a pyroxylin lacquer, since no running of the color occurs.

The color of leather, which has been dyed with a dyestuff containing an acid group and afterwards treated with the acid salt of an arylamine containing inorganic substituents in the nucleus, becomes better resistant to fat liquor used for softening chrome tanned leather.

The above general designation "a dyestuff containing at least one acid group", will readily be understood to denote and include dyestuffs, or metal salts thereof, of all classes which contain one or more true acid groups, such as the sulfonic acid group or carboxylic acid group, and particularly of the class known as acid dyestuffs, and not to include dyestuffs which contain a phenolic hydroxyl group but not a true acid group. The invention is particularly applicable to the conversion into new coloring matters of acid dyestuffs of the azo class, such as the monazo-, disazo-, trisazo-dyes, etc., and more particularly of the monazo dyestuffs containing a sulfonic group.

The term "arylamine containing at least one inorganic substituent in the nucleus" is intended to denote and include primary, secondary and tertiary arylamines containing one or more inorganic substituents wherein the inorganic substituent does or does not link an organic radical to the aryl residue. Although I prefer to employ arylamines, particularly of the benzene series, containing non-ligamentary inorganic substituents in the nucleus, i. e., arylamines wherein the inorganic substituent does not link an organic radical to the aryl nucleus (for example p-aminophenol, β-aminoanthraquinone, chloraniline, dichloraniline, sulfanilic acid, p-nitraniline, m-nitraniline, m-nitro-p-toluidine, p-nitro-toluidine, dichlor-p-nitraniline, etc.), the invention is not limited thereto but includes the employment of arylamines containing ligamentary inorganic substituents in the nucleus, i. e., arylamines wherein an inorganic substituent links an organic radical to the aryl nucleus (for example, anisidine, dianisidine, cresidine, aminoazobenzene, aminoazotoluene, thioaniline, 3-thio-o-toluidine, etc.). However, other arylamines, such as the esters of aminobenzoic acid, of anthranilic acid, etc., may be employed.

The new coloring matters are probably salts of the bases employed, wherein one or more acid groups of the dyestuff are combined with the stoichiometric proportion of an arylamine as herein specified. However, I do not intend to be limited to the above theory in defining my invention.

The invention is illustrated by the following examples. The parts are by weight.

*Crocein orange Y with p-aminophenol*

Example 1.—To a boiling solution of 50 parts of crocein orange Y concentrated (Color Index No. 26), as the mono sodium salt, dissolved in 2500 parts of water, there is added an aqueous solution containing about 8.3 per cent. p-aminophenol and 2.62 per cent. HCl, until the precipitation of the new coloring matter is substantially complete. The precipitated coloring matter is filtered off hot, washed and dried. It is an orange powder, difficultly soluble in water, and soluble in alcohol with an orange colored solution.

*Crocein scarlet MOO with p-nitraniline*

Example 2.—To a boiling solution of 50 parts of crocein scarlet MOO (Color Index No. 252), as the mono sodium salt, dissolved in 2500 parts of water, there is added an aqueous solution containing about 8.3 per cent. p-nitraniline and 2.62 per cent. hydrochloric acid until the precipitation of the new coloring matter is substantially complete. The precipitated coloring matter is filtered hot, washed and dried. It is a scarlet powder, soluble in alcohol with a scarlet colored solution.

Example 3.—By following the procedure described in Example 1, using 50 parts alizarine cyanine green GX (Color Index No. 1078) as its sodium salt in place of crocein orange Y, a new coloring matter is obtained, which when dried is a green powder soluble in alcohol with a green color.

Example 4.—By following the procedure described in Example 2, using 50 parts alizarine cyanine green GX as its sodium salt in place of crocein scarlet MOO, a new coloring matter is produced, which when dried is a green powder, soluble in alcohol with a green color.

Example 5.—By following the procedure described in Example 2, using 50 parts of the sodium salt of 4-benzene-azo-1-(2'-chlor-5'-sulfophenyl)-3-methyl-5-hydroxypyrazol in place of crocein scarlet MOO, a new coloring matter is produced which when dried is a yellow powder, soluble in alcohol with a yellow color.

The procedure, as described in the above examples, is not dependent upon any theory for its operativeness, it being only necessary to add the acid solution of the arylamine to the dyestuff containing an acid radical until reaction is complete, as indicated when no increase in the quantity of precipitate is noted. The quantity of water and of acid employed, the temperature and other conditions, may be varied through wide limits. Instead of an acid solution of arylamine, a water solution of the corresponding arylamine salt may be used. Also, in place of hydrochloric acid, other mineral acids for example, sulfuric acid, or organic acids, for example acetic acid, may be employed.

As an alternative procedure, for preparing the new coloring matters, the arylamine salts above specified may be mixed with the dyestuff in the form of the salt and a solvent for the new coloring matter added to bring about the reaction. Or the free arylamine may be reacted with the dyestuff in the form of the free acid in the presence or absence of a solvent.

As a further illustration of the invention, any one of the following dyestuffs may be combined with any one of the bases hereinbefore mentioned, in the manner as herein described to produce the corresponding new coloring matters:

Dyestuffs

| C. I. No. | C. I. Name | C. I. No. | C. I. Name |
|---|---|---|---|
| 1078 | Alizarine cyanine green GX. | 138 | Metanil yellow |
| 31 | Fast crimson GR | 153 | Fast fuchsine G |
| 1053 | Alizarin sapphire SE | 202 | Superchrome blue B |
| 26 | Crocein orange Y conc | 169 | Superchrome violet B |
| 179 | Azorubine | 216 | Superchrome red B |
| 671 | Alphazurine FG | 167 | Alizarol brown 2R |
| 151 | Wool orange A | 699 | Acid fast violet BG |
| 252 | Crocein scarlet MOO | 299 | Chrome black F |
| 636 | Fast wool yellow 3GL | 1062 | Alizarine blue 2RC |
| 57 | Fast crimson 6BL | 598 | Erie fast brown GR |
| 146 | Azo yellow A5W | 420 | Erie fast brown 3RB |
| 1180 | Indigotine | 581 | Erie black GXOO |
| 168 | Superchrome garnet Y | 419 | Erie fast red FD |
| 56 | Fast fuchsine 6B | 27 | Wool orange 2G |
| 161 | Wool orange R | 208 | Fast wool blue R |
|  |  | 246 | Buffalo black NBR |

4-benzene-azo-1-(2'-chlor-5'-sulfophenyl)-3-methyl-5-hydroxypyrazol (U. S. P. 1,511,074).

Pyroxylin molding compositions

Example 6.—One part orange coloring matter, obtained by reacting in acid solution crocein orange Y with p-aminophenol, as described above in Example 1, is dissolved in 1 gallon alcohol, and sufficient of this solution is then added to a mixture of

| | Parts |
|---|---|
| Pyroxylin | 100 |
| Camphor | 35 |
| Urea | 1 | to produce the desired shade. The colored plastic mass is then molded to shape under heat and pressure.

Wood stain

Example 7.—One part green coloring matter, obtained by reacting in acid solution alizarine cyanine green GX with p-aminophenol, as described in Example 3, is dissolved in 25 parts of denatured alcohol. About 10 parts benzol are then added. The resulting solution does not raise the grain of wood, and stains it a light green which is fast to light and does not bleed when covered with a nitro-cellulose lacquer.

Pyroxylin lacquer

Example 8.—One ounce of scarlet coloring matter, obtained by reacting crocein scarlet MOO with p-nitraniline as described in Example 2, is dissolved in one pint of denatured alcohol. Sufficient of this solution is added to a pyroxylin lacquer prepared by mixing

| | |
|---|---|
| Nitrocellulose | 23 oz. |
| Gum damar | 8 oz. |
| Ester gum | 8 oz. |
| Tricresyl phosphate | 8 oz. |
| Butyl acetate | 2 pts. |
| Butanol | 4 pts. | to produce the desired shade.

Bakelite C composition

Example 9.—

| | Parts |
|---|---|
| Bakelite A | 100 |
| Wood flour | 100 |
| Yellow coloring matter (prepared as described in Example 5) | 2 |

The above ingredients are thoroughly mixed and milled into sheets which are then powdered and molded under heat and pressure to form a colored bakelite C composition.

I claim:

1. The organic amine salt which is the reaction product of a dyestuff containing at least one acid group but not containing a diazo group with an arylamine containing at least one inorganic substituent in the nucleus.

2. The organic amine salt which is the reaction product of a dyestuff containing at least one sulfo group but not containing a diazo group with an arylamine containing at least one inorganic substituent in the nucleus.

3. The organic amine salt which is the reaction product of a dyestuff containing at least one sulfo group but not containing a diazo group with a phenylamine containing at least one inorganic substituent in the nucleus.

4. The organic amine salt which is the reaction product of a dyestuff containing a sulfo group but not containing a diazo group with p-aminophenol.

5. The organic amine salt which is the reaction product of a dyestuff containing a sulfo group but not containing a diazo group with para-nitraniline.

6. The organic amine salt which is the reaction product of a dyestuff containing an acid group but not containing a diazo group with an arylamine containing at least one non-ligamentary inorganic substituent in the nucleus.

7. The organic amine salt which is the reaction product of a dyestuff containing a sulfo group but not containing a diazo group with an arylamine containing at least one non-ligamentary inorganic substituent in the nucleus.

8. The organic amine salt which is the reaction product of crocein orange Y with para-aminophenol, said salt being soluble in alcohol.

9. The organic amine salt which is the reaction product of 4-benzene-azo-1 (2'-chlor-5'-sulfophenyl)-3-methyl-5-hydroxypyrazol with para-nitraniline, said salt being soluble in alcohol.

10. The process for producing a colored composition which comprises reacting a dyestuff containing at least one acid group but not containing a diazo group with an arylamine containing at least one inorganic substituent in the necleus to produce an amine salt.

11. The process for producing a colored composition which comprises reacting a dyestuff containing at least one sulfo group but not containing a diazo group with an arylamine containing at least one inorganic substituent in the nucleus to produce an amine salt.

12. The process for producing a colored composition which comprises reacting a dyestuff containing at least one sulfo group but not containing a diazo group with an arylamine containing at least one non-ligamentary inorganic substituent in the nucleus to produce an amine salt.

13. A process for producing a colored composition which comprises reacting a dyestuff containing at least one sulfo group but not containing a diazo group with a phenylamine containing at least one non-ligamentary inorganic substituent in the nucleus to produce an amine salt.

14. The process for producing a colored composition which comprises reacting a dyestuff containing at least one sulfo group but not containing a diazo group with para-aminophenol in the presence of an acid.

15. The process for producing a colored composition which comprises reacting a dyestuff containing at least one sulfo group but not containing a diazo group with para-nitraniline in the presence of an acid.

16. The process which comprises reacting in the presence of an acid crocein orange Y with para-aminophenol.

17. The process for producing a colored composition which comprises heating an aqueous solution of a metal salt of an azo dyestuff containing at least one acid group but not containing a diazo group with an arylamine containing at least one inorganic substituent in the nucleus in the presence of an acid.

18. The process for producing a colored composition which comprises heating an aqueous solution of an alkali metal salt of an azo dyestuff containing at least one sulfo group but not containing a diazo group with a phenylamine containing at least one non-ligamentary inorganic substituent in the nucleus in the presence of an acid selected from the group consisting of hydrochloric acid, sulfuric acid and acetic acid.

19. The process for producing a colored composition which comprises heating an aqueous solution of an alkali metal salt of a monazo dyestuff containing at least one sulfo group but not containing a diazo group with para-aminophenol and hydrochloric acid.

20. The process for producing a colored composition which comprises heating an aqueous solution of an alkali metal salt of a monazo dyestuff containing at least one sulfo group but not containing a diazo group with para-nitraniline and hydrochloric acid.

21. The process which comprises reacting in the presence of an acid 4-benzene-azo-1 (2'-chlor-5'-sulfophenyl)-3-methyl-5-hydroxypyrazol and para-nitraniline.

22. The organic amine salt which is the reaction product of an azo dyestuff containing a sulfo group but not containing a diazo group with a phenylamine containing at least one nonligamentary inorganic substituent in the nucleus.

23. The organic amine salt which is the reaction product of a dyestuff containing at least one acid group but not containing a diazo group with an arylamine containing in the nucleus at least one inorganic substituent but not containing an acidic solubilizing group.

24. The organic amine salt which is the reaction product of a dyestuff containing at least one sulfo group but not containing a diazo group with an arylamine containing in the nucleus at least one inorganic substituent but not containing an acidic solubilizing group.

HARRY GEORGE KIERNAN.